United States Patent [19]

Hale

[11] Patent Number: 4,699,395

[45] Date of Patent: Oct. 13, 1987

[54] UNIVERSALLY INSERTABLE, ROTATABLE SLEEVE AND CAM COUPLING

[76] Inventor: Isom H. Hale, 2507 Stratford Dr., Austin, Tex. 78746

[21] Appl. No.: 874,055

[22] Filed: Jun. 13, 1986

[51] Int. Cl.[4] .............................................. B60D 1/06
[52] U.S. Cl. ................................ 280/511; 280/423 R; 280/507; 280/512
[58] Field of Search ............... 280/511, 504, 507, 512, 280/423 R

[56] References Cited

U.S. PATENT DOCUMENTS

| | | | |
|---|---|---|---|
| 2,634,987 | 4/1953 | Palmer | 280/512 |
| 3,650,546 | 3/1972 | Koenig | 280/423 R |
| 4,209,184 | 6/1980 | Byers | 280/511 |
| 4,444,410 | 4/1984 | Martin | 280/512 |

Primary Examiner—John J. Love
Assistant Examiner—Mitchell J. Hill
Attorney, Agent, or Firm—John Nevin Shaffer, Jr.

[57] ABSTRACT

A coupling for attaching one mechanical device, such as a truck, to another mechanical device, such as a trailer, by the use of a rotatable sleeve located around a coupling arm on which is positioned a socket member with one or more free floating cam which are allowed to move in and out of cam openings by rotating the rotatable sleeve, thereby locking or releasing a ball, or other type, of hitching member in the socket area. The coupling arm and rotatable sleeve can be fashioned in varying lengths so that the hitching ball, or other type of hitching member, can be located in recessed or otherwise remote and inaccessible areas and still be utilized for towing.

9 Claims, 7 Drawing Figures

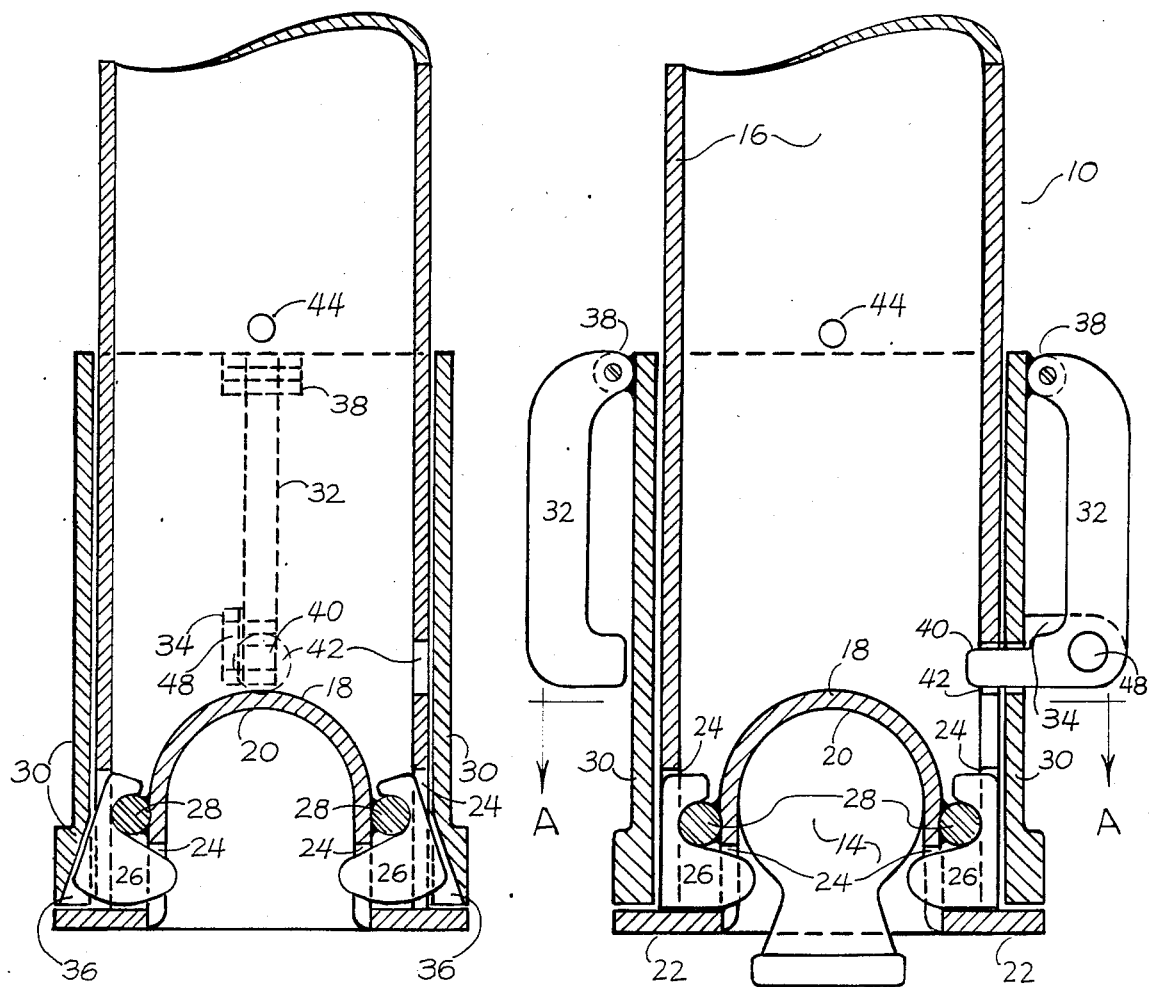
FIGURE 3
FIGURE 2
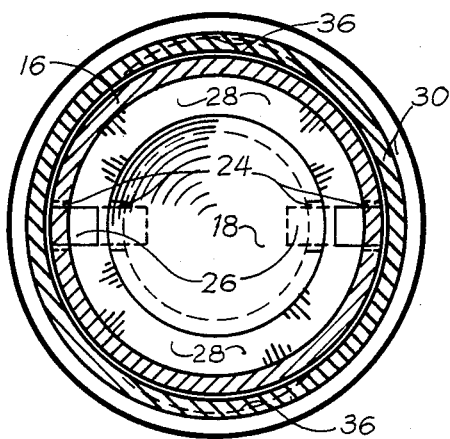
FIGURE 4

4,699,395

UNIVERSALLY INSERTABLE, ROTATABLE SLEEVE AND CAM COUPLING

BACKGROUND OF THE INVENTION

This invention relates to an improved, universally insertable, rotatable sleeve and cam coupling apparatus and method for the safe positive connection of one mechanical means, for instance a trailer, to another mechanical means, for instance a truck.

Trailer hitches have been known in the art for quite some time. Typically the hitching apparatus is utilized with a ball type member attached to the towing vehicle while the hitching means is attached to the item desired to be towed. The hitching apparatus generally is attached to the item to be towed on the same horizontal plane as the ball is to the towing vehicle. The towing vehicle is then backed up to the item to be towed and the free ball hitch is then covered with the hitching apparatus and secured in place with a variety of springs, handles and locks. An example of such a hitch is described in Martin, U.S. Pat. No. 4,444,410, which discloses a spring assisted lever that forces a restraining means beneath the ball of the ball hitch and thereby holds the device in a fixed position. Byers, U.S. Pat. No. 4,209,184, discloses yet another of these trailer hitch devices whereby a push rod is utilized to provide a "self-locking trailer hitch assembly".

A drawback to these and other hitching mechanisms is that they are mechanically complex and are comprised of many parts, some of which are under spring tension, which are subject to wear and failure. Additionally, a further drawback is that in order for these previous devices to function correctly, the ball hitch must be exposed and accessible for connection with a hitching means that approaches it on the same horizontal plane. A further disadvantage is that previous devices are primarily designed to withstand horizontal forces between the ball and the hitch assembly and are relatively weak when verticle or upward pressure is placed on the hitch assembly.

Thus, there is a need in the art for providing a universally insertable, rotatable sleeve and cam coupling having high strength, that is safe and simple to operate, and which is constructed in such a manner that a remote ball or other hitching device can be attached to a hitch even though the ball or other hitching device is in a recessed, remote, difficult to reach or normally inaccessible area. This is accomplished by extending the portion of the device located below the operating handles of the device to any desired length. It is a further object of the invention to provide a coupling that does not rely on a spring for any operation, including that needed to engage or release the ball itself, and one that does not rely on any kind of bolting mechanism to engage or release the ball. It is a further object to provide a coupling equally effective in any plane and which is not limited to horizontal coupling alone.

SHORT STATEMENT OF THE INVENTION

Accordingly, the universally insertable, rotatable sleeve and cam coupling of the present invention includes a coupling arm to which is attached a socket member conformed to receive a ball shaped hitch means. Around the outside of the socket member is attached a hinged joint rod from which one or more free floating coupling cams are rotatably attached. Cam openings are provided in the socket member and coupling arm through which a part of the coupling cam can protrude and withdraw. A rotatable retaining sleeve, with one or more cam recessed areas cut out of the inside of the sleeve, is slipped over the coupling arm and prevented from rising above the coupling cams by means of a removably attachable bumper pin. As a result of this configuration, by rotating the retaining sleeve the cams will be forced to their inward or locking position by the solid inside face of the retaining sleeve, and said cams will be allowed to withdraw from this locking position when the retaining sleeve is rotated so that the recessed areas in the retaining sleeve match up with the coupling cams. A pair of oppositely positioned handles are attached to the outside of the rotatable retaining sleeve and one or more of the handles is provided with a protrusion which, when the protrusion passes through a pair of matching holes in the coupling arm and the rotatable retaining sleeve, prevents the retaining sleeve from rotating further and locks the retaining sleeve in position. The utilization of a locking guard is provided that matches up with the locking handle so that an ordinary key or combination lock can be inserted through matching holes in the locking guard and the locking handle, thereby preventing accidental movement of the handle once it is in this locked position. As a result of this configuration, a universally insertable, rotatable sleeve and cam coupling device is provided that can safely secure one mechanical device to another mechanical device without fear of spring failure or breakdown of complicated mechanical combinations. Additionally, as an example, this device enables a ball hitch to be recessed below the flat bed of a truck so that the entire bed is usable when towing is not desired. This configuration also eliminates any projections extending from the rear of the towing vehicle and enables a more secure and safe connection to be made between the towing vehicle and the vehicle to be towed.

BRIEF DESCRIPTION OF THE DRAWINGS

Other objects, features and advantages of the present invention will become fully apparent from the following detailed description of the preferred embodiment, the appended claims and the accompanying drawings in which:

FIG. 2 is a longitudinal, vertical sectional view of the device depicted in FIG. 1 in a locked position and attached to a hitching ball;

FIG. 3 is a longitudinal, vertical sectional view of the device depicted in FIG. 1 shown in an open and unhitched position;

FIG. 4 is a top view of a horizontal, sectional view through the device at a point immediately above the top of the socket 18 along line A—A of FIG. 2 showing the device in the locked position.

DETAILED DESCRIPTION OF THE PREFERRED EMBODIMENT

The preferred embodiment of the present invention is illustrated by way of example in FIGS. 1-7.

Figure 1:
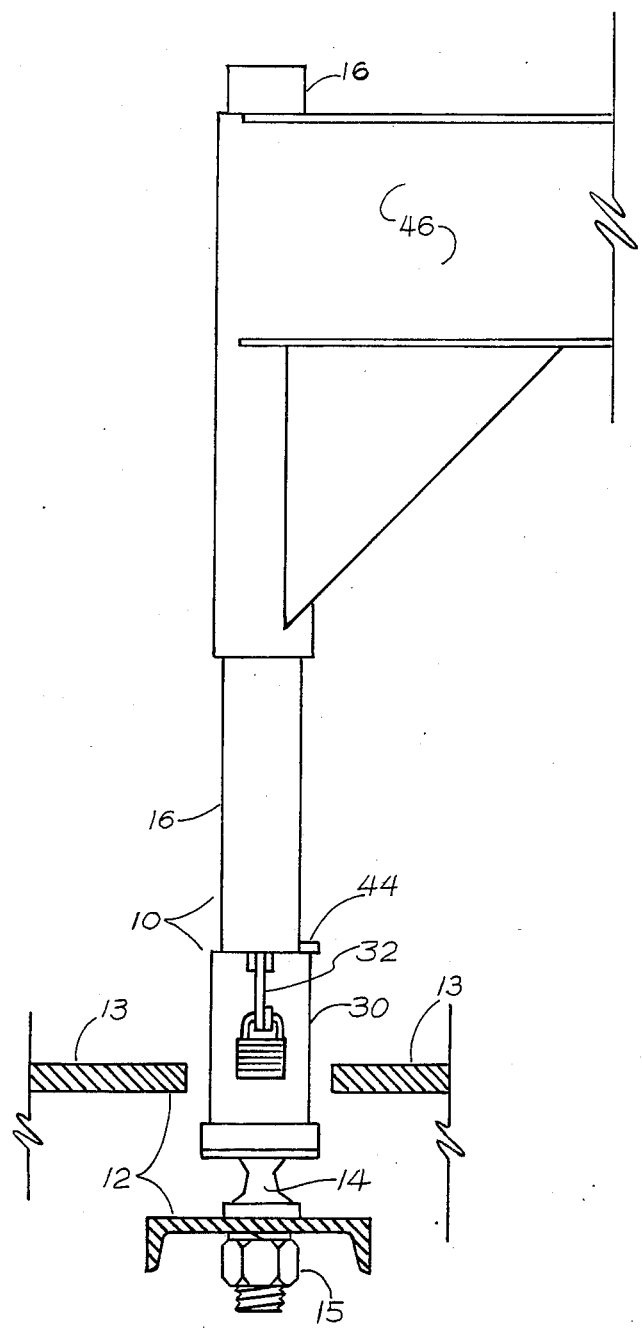
FIG. 1 is a side view of a preferred embodiment of this universally insertable, rotatable sleeve and cam coupling attached to the neck of a goose neck trailer which is itself attached, for towing, to a ball hitch recessed in the bed of a truck.

With specific reference to FIG. 1, a universally insertable, rotatable sleeve and cam coupling 10 is shown in one embodiment wherein it is attached to the framework of a towing vehicle 12 by means of a hitching ball 14. The hitching ball 14, held in place by ball securing nut 15, is recessed below the bed 13 of the towing vehicle. Coupling 10 includes a coupling arm 16 which can be attached to the object to be towed, such as the neck 46 of a trailer (not shown), as illustrated in FIG. 1, and further includes a rotatable retaining sleeve 30, more fully described hereafter.

Referring now to FIG. 2, coupling 10 is further illustrated by disclosing socket member 18 which is attached to coupling arm 16. Socket member 18 is shaped so that it is concave and conforms to the shape of hitching ball 14. As a result, spherical surface area 20 is formed whereby continuous contact between coupling 10 and hitching ball 14 is provided. Socket member 18 is also shaped with a flanged rim 22 which guides hitching ball 14 into socket member 18 and which is attached to coupling arm 16 by means of welding or any other suitable means known in the art.

Referring now to FIG. 3, cam openings 24 are shown in the coupling arm 16 and socket member 18 which are located directly above flange rim 22. FIGS. 2, 3 and 4 illustrate the operation of the device in open and closed positions by way of illustrating the operation of coupling cams 26. In FIG. 2, coupling cams 26, shown suspended from hinged joint rod 28, are shown protruding through cam openings 24 and held in position by the solid inner face of rotatable retaining sleeve 30. FIG. 2 also illustrates two oppositely positioned handles 32 and lock hanger 34. FIG. 3 illustrates the "open" position wherein rotatable retaining sleeve 30 has been rotated by handles 32 so that recessed areas 36 are aligned with coupling cams 26 which allow coupling cams 26 to swing freely out of cam openings 24 thereby allowing hitching ball 14 to be removed or inserted.

Referring to FIG. 2, oppositely positioned handles 32 are rotatably suspended from handle sockets 38 located near the top of rotatable retaining sleeve 30. Oppositely positioned handles 32 are thereby able to swing out and away from the sides of rotatable retaining sleeve 30. As clearly shown in FIG. 2, at least one of said handles has protruding rod 40 built into the free end of said handle. As a result, when rotatable retaining sleeve 30 is in the position shown in FIG. 2, which is the locked position with the solid interior walls of rotatable retaining sleeve 30 flush against the edge of coupling cams 26, coupling cams 26 are held in a position partly protruding through cam openings 24 thereby securely holding hitching ball 14 in place. The provision of matching securing openings 42 in the sides of rotatable retaining sleeve 30 and coupling arm 16 enables protruding rod 40, when the device is in this position, to enter into the matching securing openings 42 thereby preventing rotation of rotatable retaining sleeve 30. The ability to prevent inadvertent or unauthorized movement of rotatable retaining sleeve 30 is further enhanced by means of lock hanger 34 positioned near the free end of the handle 32 with protruding rod 40 and positioned so that a locking hole 48 in the lock hanger 34 notches with a locking hole 48 in said handle. As a result, a combination, key or any other type of lock may be inserted through the locking holes 48 to insure that inadvertent or unauthorized rotation of rotatable retaining sleeve 30 is prevented.

Also illustrated in FIGS. 2 and 3 is bumper pin 44 which is removably attachable to coupling arm 16 and which serves the purpose of preventing rotatable retaining sleeve 30 from being pulled above coupling cams 26. Once bumper pin 44 is removed, however, it is a simple matter to lift rotatable retaining sleeve 30 above coupling cams 26 so that they may be removed for repair or replacement.

FIG. 4 is a top view of the device 10 shown in the locked position illustrated in FIG. 2. From this top view it is clear that the device is in the locked position with the solid walls of rotatable retaining sleeve 30 snug against the backs of coupling cams 26 thereby insuring that the cams 26 remain protruded through cam openings 24 and engaged with hitching ball 14. In this figure, recessed areas 36 are shown rotated 90° away from cams 26, however cams 26 are locked at any position except where the cams are allowed to enter the recessed areas 36 of the rotatable sleeve 30. Further, the operation of the device is same when utilizing one, three, four or more coupling cams 26 and corresponding cam recessed areas 36 (see FIGS. 5, 6 and 7).

In one embodiment then, coupling arm 16 is attached to a suitable towing means such as goose neck trailer neck 46, as illustrated in FIG. 1. Rotatable retaining sleeve 30, which conforms in size so as to just slip over the outside of coupling arm 16, may be of various lengths so that a useful locking function is provided no matter how far hitching ball 14 is recessed within the body of a device to be hitched, as illustrated in FIG. 1. This ability to provide safe and sure connection between the towing vehicle and the towed vehicle while hitching ball 14 is in a recessed position, which thereby frees the bed 13 of the towing vehicle for normal use when a trailer is not being towed, is a distinct and obvious advantage over the art. When in the "locked" position, as illustrated in FIGS. 2, 4, 5, 6 and 7 rotatable retaining sleeve 30 holds coupling cams 26 in their locked position through cam openings 24 thereby engaging hitching ball 14 and retaining said ball in that position. Oppositely positioned handles 32 are attached near the top of rotatable retaining sleeve 30 on handle sockets 38 which enable the handles to swing out and away from rotatable retaining sleeve 30 while the handles 32 are being used to rotate rotatable retaining sleeve 30. One or more of said handles 32 have a protruding rod 40 that, when matching securing openings 42 in coupling arm 16 and rotatable retaining sleeve 30 are aligned, passes through matching securing openings 42 and thereby prevents rotatable retaining sleeve 30 from rotating. By utilization of machine locking holes 48 in handle 32 and lock hanger 34 a common key or combination lock or some other form of lock may be passed through locking holes 48 thereby preventing handle 32 with protruding rod 40 from being removed from matching securing openings 42 and insuring that once the device is placed in position it will remain in that position until positive action is taken to change it.

Removal of the hitching ball 14 from device 10 is accomplished by withdrawing handle 32 with protruding rod 40 from matching securing openings 42, grasping oppositely positioned handles 32 and rotating rotatable retaining sleeve 30 in either direction. As shown in FIG. 3, once rotatable retaining sleeve 30 has been rotated, oppositely positioned recessed areas 36 are aligned with coupling cams 26 and allow coupling cams 26 to free float or swing backwards into the recessed areas 36 so that hitching ball 14 may be removed and/or inserted.

Bumper pin 44 is removably attached to coupling arm 16 thereby preventing rotatable retaining sleeve 30 from being raised above coupling cams 26 inadvertently. Removing bumper pin 44 enables rotatable retaining sleeve 30 to be raised above coupling cams 26 thereby allowing their removal, replacement and/or repair.

Figure 5:
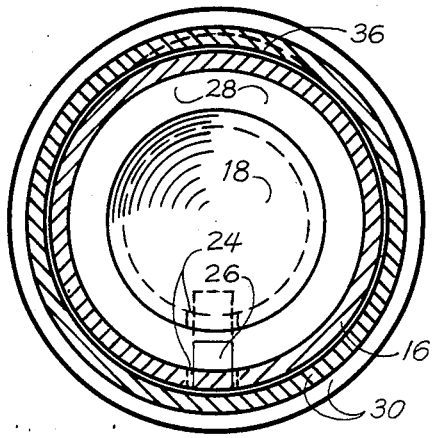
FIGS. 5, 6, and 7 are top views of horizontal sectional views similar to FIG. 4 illustrating the device with cams and recessed areas for one, three and four cam couplings, respectively.
Figure 6:
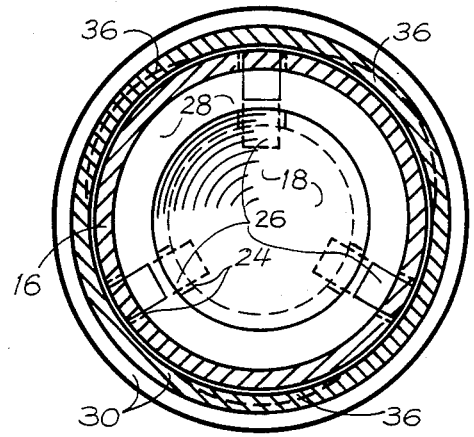
Figure 7:
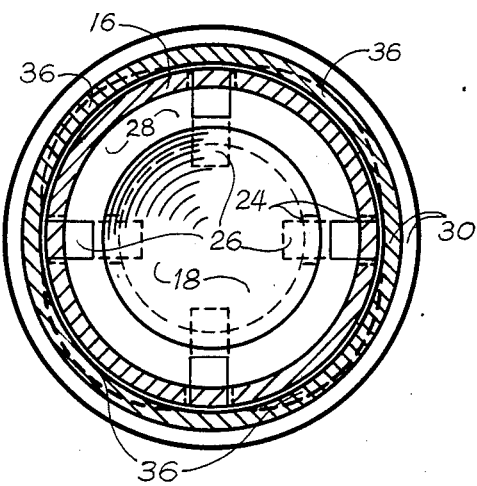

As is clear from the discussion above, coupling 10 may be modified in various obvious ways, such as providing a protruding rod 40 on both handles 32 along with accompanying matching securing openings 42 in coupling arm 16 and rotatable retaining sleeve 30. Additionally, there may be more than one bumper pin 44 and there may be one or more coupling cams 26. FIGS. 5, 6 and 7 illustrate device 10 with one, three and four coupling cams and corresponding recessed areas 36.

Additionally, the device is safe because positive locking can be accomplished with high strength materials that do not rely on spring tension for success. Also, coupling 10 has no complex mechanical parts subject to wear or breakdown as so often happens with prior art hitching devices. Further, the present invention provides an improved hitch which can be easily manipulated by the user without the necessity of additional levers, springs, screws, bolts or other items typically associated with hitching devices. Still further, the device may be used to reach hitching means in recessed areas and is not limited to use only on a horizontal plane. Thus the rotatable sleeve and cam coupling mechanism of the present invention has important advantages of simplicity, safety, and ease and variety of use.

While the discussion above concerns horizontal and vertical planes, as mentioned, this coupling will operate in any plane reference or position. Also, while the present invention has been disclosed in connection with the preferred embodiment thereof, it should be understood that there may be other embodiments which fall within the spirit and scope of the invention as defined by the following claims.

What is claimed is:

1. A universally insertable, rotatable sleeve and cam coupling apparatus comprising:
   (a) a coupling arm;
   (b) a socket member, conformed to receive a hitch means, attached to said coupling arm;
   (c) a hinged joint rod attached to the outside of said socket member;
   (d) a free floating coupling cam rotatably attached to said hinged joint rod;
   (e) a cam opening in said socket member and said coupling arm through which a part of said coupling cam can protrude and withdraw; and
   (f) a rotatable retaining sleeve, with a cam recessed area, conformed to just slip over said coupling arm and which rotates so that when said cam recessed area is aligned with said coupling cam a hitch means may be inserted and withdrawn and when said rotatable retaining sleeve is rotated so that said cam recessed area is rotated away from said coupling cam said coupling cam is held in position by said sleeve with part of said coupling cam protruding through said cam openings so that said hitch is securely held in place in said socket member.

2. The coupling of claim 1, wherein said socket member further comprises a guiding flange securedly attached to said socket member so that a distinct socket is formed by said flange and so that said hitch is guided by said flange to said socket.

3. The coupling of claim 2, wherein said rotatable retaining sleeve further comprises:
   (a) a pair of oppositely positioned handles attached near the top of said retaining sleeve by handle sockets so that said handles can swing out and away from said retaining sleeve;
   (b) a protruding rod on the free end of at least one of said handles;
   (c) a matched pair of securing openings, one in said rotatable retaining sleeve and one in said coupling arm, both conformed to accept said protruding rod so that with said protruding rod inserted in said securing openings said coupling arm and said rotatable retaining sleeve are joined and said rotatable retaining sleeve is prevented from rotating; and
   (d) a lock hanger securedly attached to said rotatable retaining sleeve with a locking hole in said lock hanger that conforms to and matches a locking hole in said handle with said protruding rod so that when said protruding rod is inserted in said securing openings both said locking holes are aligned and a locking means can be inserted therethrough thereby locking said handle in position.

4. The coupling of claim 3 wherein said coupling arm further comprises a bumper pin removeably attached to said coupling arm immediately above the top of said rotatable retaining sleeve thereby holding said rotatable retaining sleeve in position over said coupling cam so that when said bumper pin is removed said rotatable retaining sleeve can be moved upward along said coupling arm and said coupling cam can be removed and replaced.

5. The coupling of claim 4, wherein a plurality of coupling cams are attached to said hinged joint rod and a corresponding matching plurality of recessed areas are provided.

6. A universally insertable, rotatable sleeve and cam coupling apparatus comprising:
   (a) a coupling arm;
   (b) a socket member conformed to receive a hitch means, attached to said coupling arm;
   (c) a hinged joint rod attached to the outside of said socket member;
   (d) a free floating coupling cam rotatably attached to said hinged joint rod;
   (e) a cam opening in said socket member and said coupling arm through which a part of said coupling cam can protrude and withdraw;
   (f) a rotatable retaining sleeve, with a cam recessed area, conformed to just slip over said coupling arm and which rotates so that when said cam recessed area is aligned with said coupling cam a hitch means may be inserted and withdrawn and when said rotatable retaining sleeve is rotated so that said cam recessed area is rotated away from said coupling can said coupling cam is held in position with said coupling cam protruding through said cam openings so that said hitch is securely held in place in said socket member;
   (g) a guiding flange securedly attached to said socket member so that a distinct socket is formed by said flange and so that said hitch is guided by said flange to said socket;

(h) a pair of oppositely positioned handles attached near the top of said retaining sleeve by means of handle sockets so that said handles can swing out and away from said retaining sleeve;

(i) a protruding rod on the free end of at least one of said handles;

(j) a matched pair of securing openings, one in said rotatable retaining sleeve and one in said coupling arm, both conformed to accept said protruding rod so that with said protruding rod inserted in said securing openings said coupling arm and said rotatable retaining sleeve are joined and said rotatable retaining sleeve is prevented from rotating;

(k) a lock hanger securely attached to said rotatable retaining sleeve with a locking hole in said lock hanger that conforms to and matches a locking hole in said handle with said protruding rod so that when said protruding rod is inserted in said securing openings both said locking holes are aligned and a locking means can be inserted therethrough thereby locking said handle in position; and (l) a bumper pin removably attached to said coupling arm immediately above the top of said rotatable retaining sleeve thereby holding said rotatable retaining sleeve in position over said coupling cam so that when said bumper pin is removed said rotatable retaining sleeve can be moved upward along said coupling arm and said coupling cam can be removed and replaced.

7. The coupling of claim 6 wherein a plurality of coupling cams and a corresponding plurality of recessed areas are provided.

8. A method of providing a universally insertable, rotatable sleeve and cam coupling comprising the steps of:

(a) constructing a coupling arm;

(b) attaching a socket member conformed to receive a hitch means to said coupling arm;

(c) attaching a hinged joint rod to the outside of said socket member;

(d) rotatably attaching a free floating coupling cam to said hinged joint rod;

(e) constructing a cam opening in said socket member and said coupling arm through which a part of said coupling cam can protrude and withdraw;

(f) providing a rotatable retaining sleeve, with a cam recessed area, conformed to just slip over said coupling arm and which rotates so that when said cam recessed area is aligned with said coupling cam a hitch means may be inserted and withdrawn and when said rotatable retaining sleeve is rotated so that said cam recessed area is rotated away from said coupling cam said coupling cam is held in position by said rotatable retaining sleeve so that part of said coupling cam protrudes through said cam opening and said hitch is securely held in place in said socket member;

(g) attaching a guiding flange to said socket member so that a distinct socket is formed by said flange and so that said hitch is guided by said flange to said socket;

(h) attaching a pair of oppositely positioned handles near the top of said retaining sleeve by means of handle sockets so that said handles can swing out and away from said retaining sleeve;

(i) providing a protruding rod on the free end of at least one of said handles;

(j) constructing a matched pair of securing openings, one in said rotatable retaining sleeve and one in said coupling arm, both conformed to accept said protruding rod so that with said protruding rod inserted in said securing openings said coupling arm and said rotatable retaining sleeve are joined and said rotatable retaining sleeve is prevented from rotating;

(k) attaching a lock hanger to said rotatable retaining sleeve with a locking hole in said lock hanger that conforms to a locking hole in said handle with said protruding rod so that when said protruding rod is inserted in said securing openings both said locking holes are aligned and a locking means can be inserted therethrough thereby locking said handle in position; and (l) attaching a removable bumper pin to said coupling cam immediately above the top of said rotatable retaining sleeve thereby holding said rotatable retaining sleeve in position over said coupling cam so that when said bumper pin is removed said rotatable retaining sleeve can be moved upward along said coupling arm and said coupling cam can be removed and relaced.

9. The coupling method of claim 8 wherein providing a universally insertable, rotatable sleeve and cam coupling further comprises and steps of:

(a) rotatably attaching a plurality of free floating coupling cams to said hinged joint rod;

(b) constructing a plurality of cam openings in said socket member and said coupling cam through which a part of said coupling cams can protrude and withdraw; and (c) providing a rotatable retaining sleeve, with a plurality of cam recessed areas, conformed to just slip over said coupling arm and which rotates so that when said cam recessed areas are aligned with said coupling cams a hitch means may be inserted and withdrawn and when said rotatable retaining sleeve is rotated so that said cam recessed areas are not aligned with said coupling cams said coupling cams are held in position by said rotatable retaining sleeve so that part of said coupling cams protrudes through said cam openings and said hitch is securedly held in place in said socket member.

* * * * *